United States Patent [19]

Schlobohm et al.

[11] Patent Number: 5,402,223
[45] Date of Patent: Mar. 28, 1995

[54] ELECTRONIC SURVEY STADIA

[75] Inventors: Timothy A. Schlobohm; Patrick D. Maloney, both of Madison, Wis.

[73] Assignee: Smart Grade Incorporated, Madison, Wis.

[21] Appl. No.: 950,464

[22] Filed: Sep. 24, 1992

[51] Int. Cl.$^6$ .................. G01C 3/00; G01C 3/08; G01C 15/06

[52] U.S. Cl. .................. 356/3.01; 33/293; 33/294; 356/4.01

[58] Field of Search .................. 356/1, 4; 33/293, 294

[56] References Cited

U.S. PATENT DOCUMENTS

| | | | |
|---|---|---|---|
| 4,029,415 | 6/1977 | Johnson | 356/4 |
| 4,730,920 | 3/1988 | Schlemmer et al. | |
| 4,830,489 | 5/1989 | Cain et al. | 356/152 |
| 4,895,440 | 1/1990 | Cain et al. | 356/5 |

Primary Examiner—Stephen C. Buczinski

[57] ABSTRACT

An electronic survey stadia to ascertain distance and elevation data from a rotary laser beam(s) in relation to known points. To ascertain elevation data stadia is in perpendicular position in relation to rotary laser beam plane. When beam impinges upon stadia, a measurement is taken by evaluation circuit, processed by an algorithm, then stored in memory and output to display device for use. To ascertain distance measurements, stadia is placed parallel in rotary laser beam(s) plane. The stadia self calibrates by counting rotational speed of laser beam. Once RPM and direction are established, stadia then measures time of laser beam to cover a known distance within stadia. This value is then used in an algorithm to produce distance measurements, thus producing distance and elevation data to memory and display.

2 Claims, 7 Drawing Sheets

ELECTRONIC SURVEY STADIA

BACKGROUND—FIELD OF INVENTION

This invention relates to lasers, specifically to an improved detector for surveying from a rotary laser(s) to ascertain distance and elevation data in relation to known points.

BACKGROUND—DESCRIPTION OF PRIOR ART

Rotary lasers are commonly used throughout the construction and surveying industry to ascertain unknown elevation data from a known reference point. To determine distance location, it is necessary to pull tapes, adjust angle and record each location. There are electronic distance measurement machines (EDM) available to do this. These are very expensive and sophisticated instruments which often require calibration to operate correctly. These also require two men for operation; one to place the target and an engineer to operate the instrument. Thus, they are too sophisticated, fragile and expensive to be utilized in everyday construction by a lay person. Prior art U.S. Pat. No. 4,730,920-1988 Schemmer, Stuhlmuler requires the use of two circuits per increment in matrix to derive an elevation measurement. Problems with reliability are obviously a concern. Prior art only derives elevation data, distance is unobtainable with this prior art. Thus the need for a detector which will produce distance and elevation data from existing rotary laser beam(s) with simple, reliable, cost effective operation by a lay person.

OBJECTS AND ADVANTAGES

Accordingly, the objects and advantages of our invention are:
A) that only one lay person is necessary to ascertain distance and elevation data.
B) to provide a simple and reliable, yet inexpensive instrument to ascertain distance and elevation data.
C) to provide a self calibrating stadia, allowing lasers of different speed and rotational direction to operate with stadia.
D) to provide an instrument which will ascertain distance and elevation data that will work with existing rotary lasers in field.
E) to provide an electronic memory for storage and manipulation of distance and elevation data. Further objects and advantages of our invention will become apparent from a consideration of the drawings and ensuing description.

| REFERENCE NUMERALS IN DRAWINGS | | | |
|---|---|---|---|
| 20 | rotating laser beam | 22 | direction of rotating laser |
| 24 | optical filter | 26 | opto-electric sensor |
| 28 | sensor bank #1 | 30 | key pad |
| 32 | evaluation circuit | 34 | serial printer port |
| 36 | serial communications port | 38 | alpha-numeric display |
| 40 | stadia enclosure | 42 | bilateral cmos switch |
| 44 | sensor bank #1 control | 46 | sensor bank # 2 control |
| 48 | sensor bank # "N" control | 50 | sensor bank #2 |
| 52 | sensor bank # "N" | 54 | microprocessor |
| 56 | ram | 58 | program prom |
| 60 | timing circuit | 62 | shift register |
| 64 | shift register | 66 | signal conditioner |
| 68 | 8-input nand IC | 70 | 8-input nand IC |
| 72 | 2-input nor IC | 74 | interrupt signal |
| 76 | shift registers serial data | 78 | shift registers coupling |
| 80 | shift registers clock | 82 | shift registers latch |
| 84 | resistor | 86 | capacitor |
| 88 | resistor | 90 | resistor |
| 92 | norton op-amp | 94 | capacitor |
| 96 | resistor | 98 | resistor |
| 100 | resistor | 102 | resistor |
| 104 | norton op-amp | 106 | resistor |
| 108 | capacitor | 110 | resistor |
| 112 | germanium diode | 114 | potentiometer |
| 116 | voltage comparator | 118 | non-inverting input |
| 120 | inverting input | 122 | resistor |
| 124 | 16 line bus | 125 | signal conditioner input |
| 126 | 16 line bus from output of signal conditioner | | |
| 128 | microprocessor I/O port | 130 | microprocessor I/O port |
| 132 | microprocessor I/O port | 134 | microprocessor I/O port |
| 136 | microprocessor I/O port | 138 | microprocessor I/O port |
| 140 | microprocessor I/O port | 142 | microprocessor input port |
| 144 | 8-bit prom bus | 146 | 8-bit ram bus |
| 148 | serial I/O port | 150 | serial I/O port |
| 152 | key pad parallel port | 154 | alpha-numeric parallel port |
| 156 | key pad bus | 158 | alpha-numeric bus |
| 160 | #1 input of 2-input nor IC | 162 | #2 input of 2-input nor IC |
| 164 | 2-input nor IC output | 166 | printer port connector |
| 168 | serial port connector | 170 | ram bus |
| 172 | prom program bus | 174 | timing circuit signal line |
| 176 | bank #1, sensor #1 | 178 | bank # "N", sensor #1 |

Figure 1:
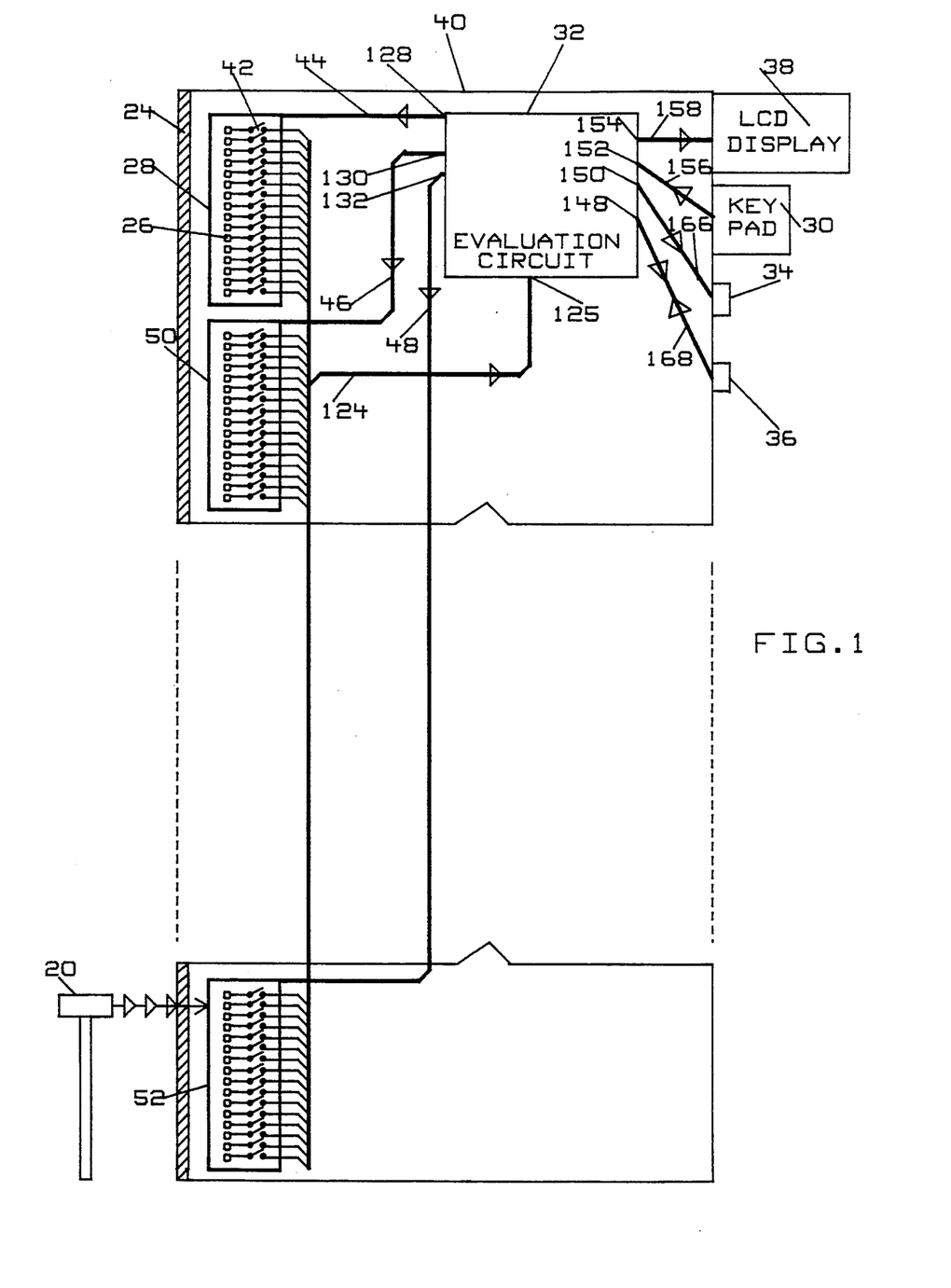
FIG. 1 is a block diagram showing the active components within the stadia enclosure.
Figure 2:
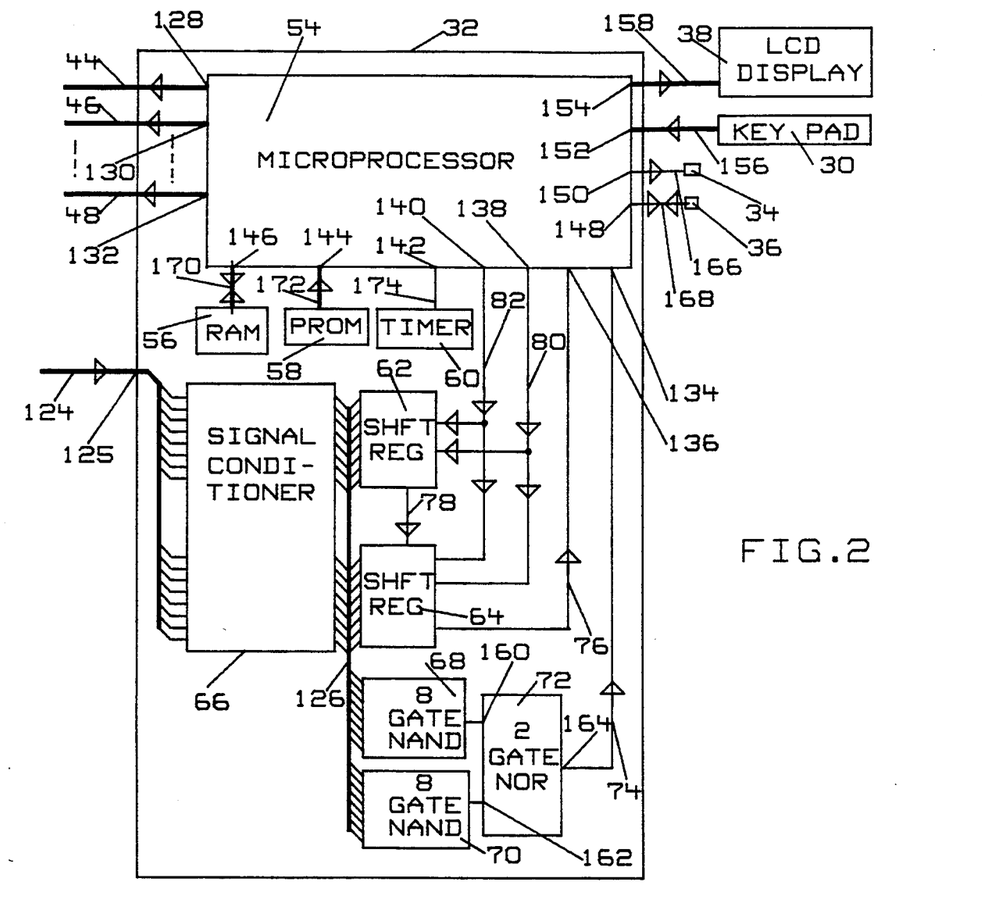
FIG. 2 is a block diagram of the evaluation circuit shown in FIG. 1.
Figure 3:
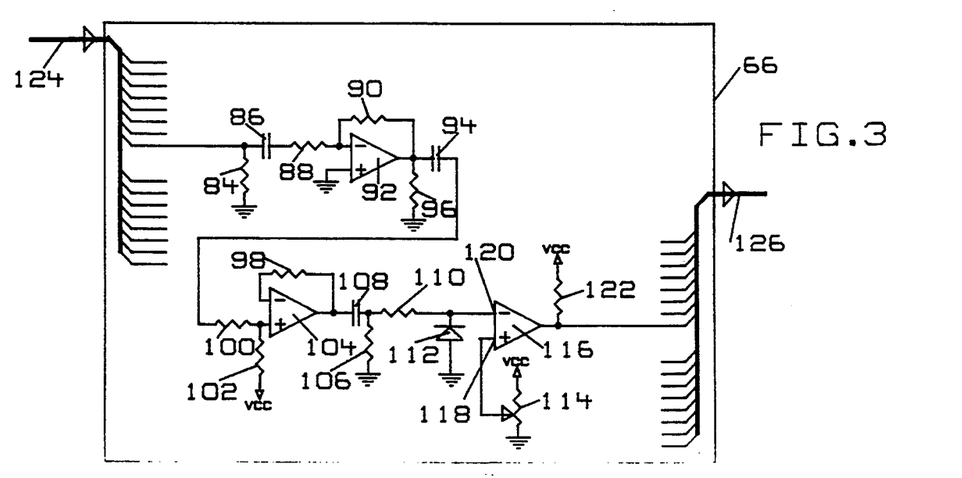
FIG. 3 shows a detailed schematic of one of sixteen circuits used in the signal conditioner shown in FIG. 2.

STATIC DESCRIPTION OF STADIA—FIGS. 1 to 3

The block diagram in FIG. 1 shows the components housed within the stadia enclosure 40. A conventional battery power supply (not shown) with on/off switch (not shown) supplies current to operate the system. Sixteen individual opto-electric sensors 26 in each of a plurality of sensor banks 28, 50 and 52 are each connected to the input of one of sixteen dedicated cmos bilateral switch 42. Each of the sensor banks 28, 50 and 52 are connected via the control lines 44, 46 and 48 to the enable I/O ports 128, 130 and 132 of evaluation circuit 32. The I/O port 154 of evaluation circuit 32 is connected via the multiple bus 158 to the alpha-numeric display 38. The I/O port 152 of evaluation circuit 32 is connected via the multiple bus 156 to the key pad 30. The I/O port 150 of evaluation circuit 32 is connected via the serial bus 166 to the serial printer port 34. The I/O port 148 of evaluation circuit 32 is connected via the bus 168 to the serial communication port 36. Each of the outputs of the sixteen cmos switches 26 on each sensor bank 28, 50 and 52 are connected via the tri-state bus 124 to the input 125 of evaluation circuit 32.

The block diagram in FIG. 2 shows the components within the evaluation circuit of FIG. 1. The ram 56 is connected via the 8-bit bus 170 to the memory I/O interface 146 of the microprocessor 54. The program prom 58 is connected via the 8-bit bus 172 to the prom interface 144 of microprocessor 54. The timing circuit 60 is connected via the signal line 174 to the counter input 142 of microprocessor 54. The I/O ports 128, 130 and 132 of microprocessor 54 are connected via the enable control lines 44, 46 and 48 to the sensor banks 28, 50 and 52 as shown on FIG. 1. The sixteen inputs to the signal conditioner 66 are connected via tri-state bus 124 to the outputs of sixteen cmos switches 26 as shown on FIG. 1. Half of the output lines of signal conditioner 66 are connected to the eight inputs of the shift register 62 and the eight inputs of the 8-input nand 68 via bus 126. The other half of the outputs of signal conditioner 66 are connected to the eight inputs of the shift register 64 and the eight inputs of the 8-input nor 70 via bus 126. The output of 8-input nand 68 is connected to one input 160 of the 2-input nor 72 and the output of 8-bit nor 70 is connected to the other input 162 of 2-input nor 72. The output of 2-input nor 72 is connected via signal line 74 to the I/O port 134 of microprocessor 54. Serial output of shift register 62 is connected via the signal line 78 to the serial input port of shift register 64. Serial output of shift register 64 is connected via signal line 76 to the I/O port 136 of microprocessor 54. The clock input of shift register 62 and the clock input of shift register 70 are both connected via signal line 80 to the I/O port 138 of microprocessor 54. The parallel latch input of shift register 62 and the parallel latch input of shift register 64 are both connected via signal line 82 to the I/O port 140 of microprocessor 54. The I/O port 154 of microprocessor 54 is connected via multiple bus 158 to alpha-numeric display 38. The I/O port 152 of microprocessor 54 is connected via multiple bus 156 to key pad 30. The I/O port 150 of microprocessor 54 is connected via the serial bus 166 to serial printer port 34. The I/O port 148 of microprocessor 54 is connected via bus 168 to serial communication port 36.

The schematic in FIG. 3 shows one of the sixteen identical circuits within the block diagrammed signal conditioner 66 in FIG. 2. Each of the sixteen lines of bus 124 is connected to the junction of capacitor 86 and resistor 84 unique to that signal. The other end of resistor 84 is tied to ground. The other end of capacitor 86 is connected to one end of resistor 88. The non-inverting input of op-amp 92 is tied to ground. The other end of resistor 88 is connected to the inverting input of op-amp 92 and one end of resistor 90. The other end of resistor 90 is connected to the junction of the output of ap-amp 92, one end of resistor 96 and one end of capacitor 94. The other end of resistor 96 is tied to ground and the other end of capacitor 94 is connected to one end of resistor 100. The other end of resistor 100 is connected to the junction of the non-inverting input of the op-amp 104 and one end of resistor 102. The other end of resistor 102 is pulled up to VCC. One end of resistor 98 is connected to the inverting input of op-amp 104. The other end of resistor 98 is connected to the junction of the output of op-amp 104 and one end of capacitor 108. The other end of capacitor 108 is connected to the junction of one end of resistor 106 and one end of resistor 110. The other end of resistor 106 is tied to ground. The other end of resistor 110 is connected to the cathode of diode 112 and the inverting input 120 of the op-amp 116. The cathode of diode 112 is tied to ground. The non-inverting input 118 of op-amp 116 is connected to the wiper of the potentiometer 114. One end of potentiometer 114 is tied to ground and the other end of potentiometer 114 is pulled up to VCC. The output of op-amp 116 is pulled up to VCC and is connected to one of sixteen signal lines in the output bus 126.

OPERATION OF STADIA—FIG. 1-2-3 Part
1—Method of laser beam detection

A plurality of sensor banks 28, 50 and 52; each containing 16 opto-electric sensors 26 that are placed in a linear configuration, are aligned in a column within the length of stadia enclosure 40. All banks 28, 50 and 52 are oriented behind an optical filter 24 that is opaque to visible light but passes infrared energy. The output of each of the 16 sensors within each bank(s) 28, 50 and 52 are accessed by means of 16 bilateral cmos switches 42, each dedicated to a single sensor. All of the control lines to the cmos switches 42 on each of the banks 28, 50 and 52 are tied together. The outputs of all cmos switches 42 on each bank 28, 50 and 52 appear on 16-line bus 124. In as much as there will never be more then one bank 28, 50 and 52 on at any one time, and cmos switches 42 are effectively tri-state devices, there can never be any contention on bus 124. On power up, the alpha-numeric display 38 prompts the operator by asking which mode ([a] Elevation measurement, or [b] Distance measurement) is required. The operator responds to the request by entering the appropriate information via key pad 30. Microprocessor 54 (FIG. 2) begins program execution by activating appropriate banks 28, 50 or 52 by pulling up the control lines 44, 46 or 48 to cmos switches 42. The output level of sensor(s) 26 will be placed on bus 124 as a result of the cmos switches 42 being turned on. The optical filter 24 minimizes the effect of ambient light conditions upon the sensor(s) 26 output. If the energy of rotating laser beam 20 impinges upon one or more sensor(s) 26 of a selected bank 28, 50 or 52 then a change in output level in the form of a pulse will occur. The line(s) in bus 124 connected to these sensor(s) 26 thru their respective cmos switches 42 are coupled thru capacitor 86 (FIG. 3) to their unique input(s) in signal conditioner 66. A terminating resistor 84 prevents the inverting input to op-amp 92 from floating while different banks 28, 50 or 52 are off-line during their scanning sequence. The ratio of resistor 88 and resistor 90 determine the gain of op-amp 92. The non-inverting input of op-amp 92 is referenced to ground. The output of op-amp 92 is connected to the input of op-amp 104 thru capacitor 94, which removes the DC component from the amplified signal pulse. Resistor 96 is necessary as a load for op-amp 104. The ratio of resistor 100 and resistor 98 determine the gain of op-amp 104. Resistor 106 is needed as a load for op-amp 104. The non-inverting input to op-amp 104 is referenced to VCC. Capacitor 108 couples the amplified signal of op-amp 104 to the inverting input 120 of voltage comparator 116 thru current limiting resistor 110 and removes the DC component from the signal. Germanium diode 112 protects the inverting input 120 of voltage comparator 116 from being damaged from a voltage signal going below ground. The output of voltage comparator 116 is pulled up to VCC by resistor 122. Potentiometer 114 is used as a voltage divider. The wiper of potentiometer 114 that is connected to the non-inverting input 118 of voltage comparator 116 is adjusted to set the level detection of the circuit. If a voltage level is applied to inverting input 120 of voltage comparator 116 that exceeds the threshold setting of non-inverting input 118, then a change in the output state of voltage comparator 116 will occur, I.E., it will be pulled low and will appear on one of the signal lines on bus 126 as a digital low. Either the 8-input nand 68 or 8-input nand 70 will reflect this change by pulling high one of the inputs 160 or 162 of the 2-input nor 72. A high input to either input 160 or 162 of the 2-input nor 72 will cause its output 164 to go low. The output level change of 2-input nor 164 is connected via digital line 74 to the I/O port 134 of microprocessor 138 and will cause the program to interrupt the scanning sequence of banks 28, 50 or 52. The same digital level on the line(s) in bus 126 that caused the interrupt is also connected to the parallel inputs of shift register 62 and shift register 64. Immediately following the interrupt, I/O port 82, which is connected to the latches of shift register 62 and shift register 64 via digital line 82, is pulled high and the data at their inputs is captured within shift registers 62 and 64. Microprocessor 54 I/O port 138 now clocks out 16 pulses via digital control line 80 to the clock inputs of shift register 62 and shift register 64 to dump the data thru the serial line 76 to the I/O port 136 of microprocessor 54. The data is output from microprocessor data interface 146 via the ram data bus 170 and saved in ram 56.

Figure 4:
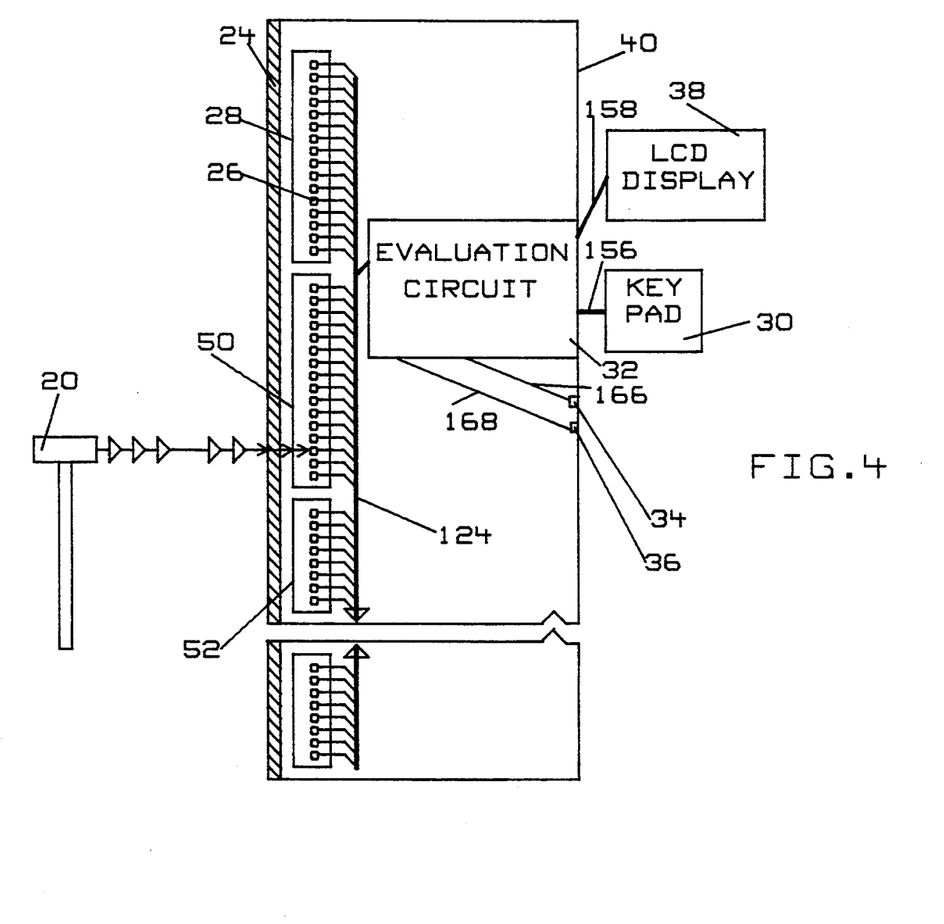
FIG. 4 shows the physical positioning of the stadia enclosure for elevation measurements.

OPERATION OF STADIA—FIG. 4 Part 2—Elevation measuring mode

As shown in FIG. 4, stadia enclosure 40 is placed perpendicular to laser beam 20. Optical filter 24 of stadia enclosure 40 is positioned so as to face laser beam 20 for measuring elevation. In the elevation measuring mode, banks 28, 50 and 52 are activated sequentially, each bank 28, 50 or 52 being turned on individually, one, and only one, at a time. Following an interrupt resulting from the detection of the laser beam 20, microprocessor 54 will halt the scanning sequence. Microprocessor 54 is now aware in which bank 28, 50 or 52 that the laser beam 20 has been detected and the position of each bank 28, 50 and 52 as referenced to the bottom of stadia enclosure 40 is known within the program. The data stored in ram 56 reflects sensor(s) 26 that caused the interrupt and their position within each bank 28, 50 and 52 is also known within the program. Using this information, microprocessor 54 computes the elevation of detected laser beam 20 in relation to the bottom of stadia enclosure 40 and displays it on alpha-numeric display 38. The information is also stored in ram 56. A hard copy of the elevation measurements can then be down loaded later thru the printer port 34.

Figure 5:
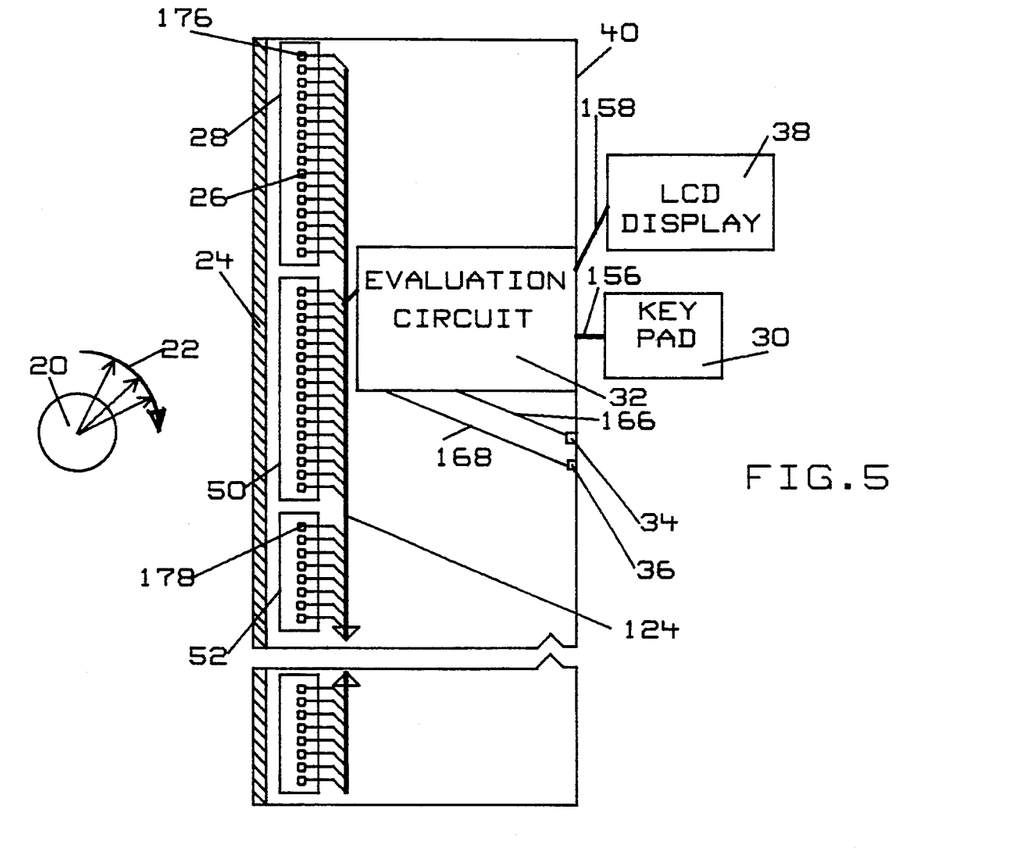
FIG. 5 shows the physical positioning of the stadia enclosure for distance measurements.

OPERATION OF STADIA—FIG. 5 Part 3—Distance measuring mode

The method of selection of banks 28, 50 or 52 to be activated differs in the distance mode from that of the elevation mode. As shown in FIG. 5, stadia enclosure 40 is placed parallel to laser beam 20. Optical filter 24 of stadia enclosure 40 is positioned so as to face laser beam 20 and lie within the rotating plane of laser beam 20. The sequence of bank 28, 50 or 52 selection is as follows. An internal counter (not shown) in microprocessor 54 that is connected to timing circuit 60 in evaluation circuit 32 (FIG. 2) thru I/O port 142 of microprocessor 54 is preset to zero (0). Bank #1 28 is turned on. When laser beam 20 is detected as it passes over sensor #1 176 in bank #1 28, the program is interrupted as described above in the "OPERATION OF THE STADIA FOR LASER DETECTION." Immediately following the interrupt, internal counter (not shown) in microprocessor 54 is enabled to the output of timing circuit 60 in evaluation circuit 32 (FIG. 2). When laser beam 20 is detected again on its next rotational pass by sensor #1 176 in bank #1 28, microprocessor 54 disables its internal counter (not shown) and saves the elapsed time period of one rotation of the laser beam 20 in ram 56 (FIG. 2). Microprocessor 54 uses this data to compute the exact RPM of the rotating laser beam 20 and stores the data in ram 56. Next, internal counter (not shown) of microprocessor 54 is again set to zero (0). Upon the next detection of laser beam 20 by sensor #1 176 in bank #1 28, internal counter (not shown) in microprocessor 54 is enabled again to the output of timing circuit 60 (FIG. 2), bank #1 28 is turned off and bank # "N" 52 at the other extremity of stadia enclosure 40 is turned on. As laser beam 20 passes along the length of stadia enclosure 40 it will cause an interrupt in the program again when it impinges upon sensor #1 178 in bank # "N" 52. Microprocessor 54 disables its internal counter (not shown) once more and stores the information in ram 56. This data represents the actual time it took the laser beam 20 to traverse the distance between sensor #1 176 of bank #1 28 and sensor #1 178 in bank # "N" 52. Using the measured rotational period of laser beam 20 and the transit time between a known distance on stadia enclosure 40, it becomes a simple matter for microprocessor 54 to compute the actual distance between the location of laser beam 20 and stadia enclosure 40. This information is then displayed to alpha-numeric display 38 and stored in memory 56. A hard copy of the distance measurements can then be down loaded later thru the printer port 34 if requested.

Figure 6:
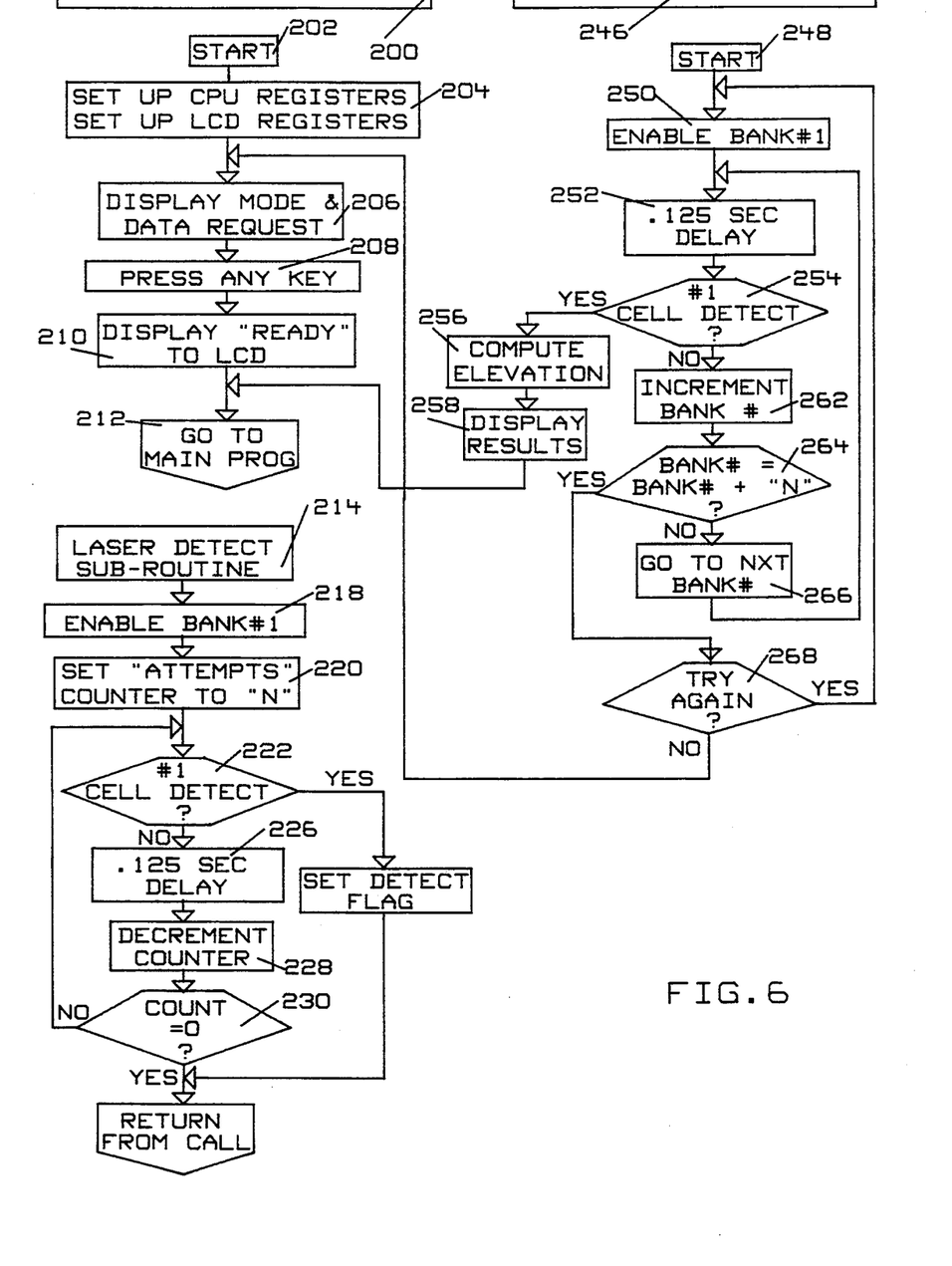
FIG. 6 shows a flow chart for the steps in the microprocessor program for initialization, laser detect subroutine and elevation measurement.
Figure 7A:
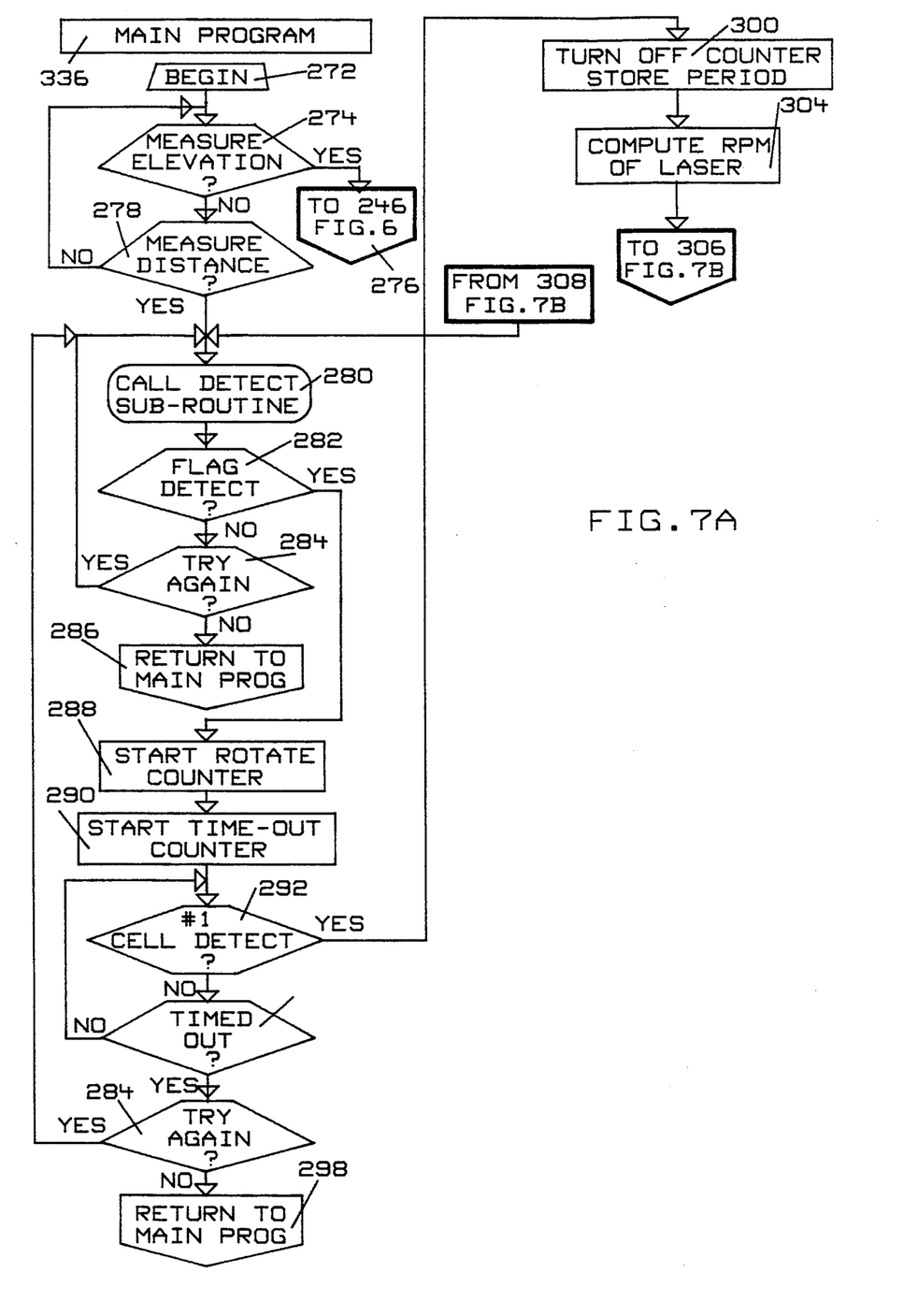
FIG. 7 shows a flow chart for the steps in the microprocessor program for the main program and distance measurement.
Figure 7B:
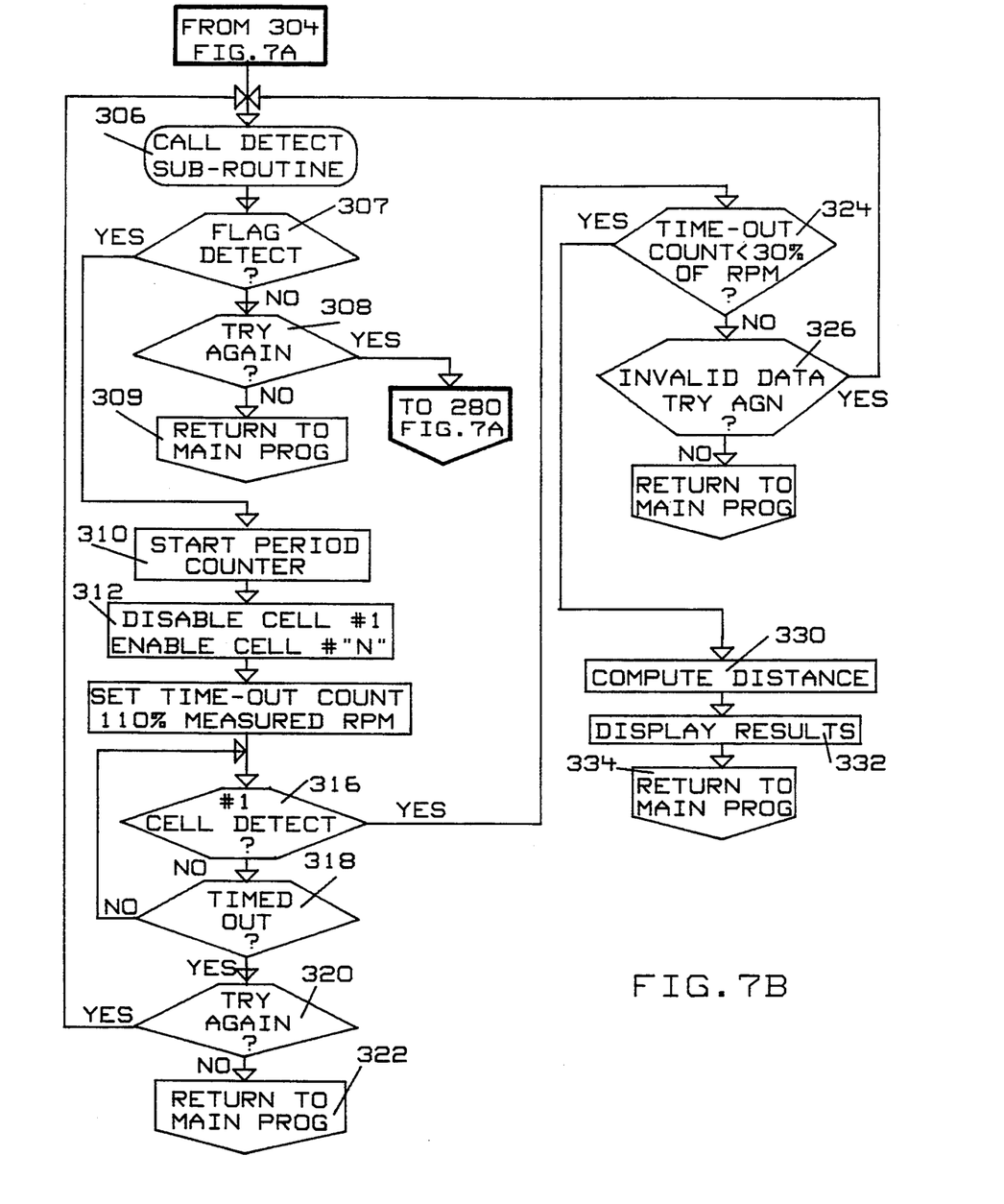

OPERATION OF STADIA—FIG. 6–7

Part 4—Description of flow chart of program.

Initialization 200 of the operating program is shown in FIG. 6 and begins with

Step 202: Microprocessor 54 (FIG. 2) is powered up by turning on on/off switch (not shown) of conventional battery power supply (not shown).

Step 204: Initialize all I/O ports and timers in microprocessor 54 (FIG. 2) and set up special registers in alpha-numeric display 38.

Step 206: The alpha-numeric display requests mode of operation (I.E., elevation or distance) and, if in elevation mode, type of data needed (I.E., measured elevation or cut/fill figures).

Step 208: Key pad 30 is used to enter requested mode of operation data, and, if in elevation mode, the proposed grade to support the cut/fill read out. Flags are set to reflect configuration.

Step 210: Alpha-numeric display reads out "ready" and program loops waiting for start key (not shown) on key pad 30 to be pressed.

Step 212: Branch to main program 336 (FIG. 7).

MAIN PROGRAM 336 begins with

Step 272: Check mode of operation (I.E., Elevation or distance).

Step 274: If elevation mode then branch to elevation loop STEP 246; else, if distance mode, to step 278.

ELEVATION LOOP 246 (FIG. 6)

Step 248: Start

Step 250: Activate sensor bank #1 28 (FIG. 1) by pulling up control line 44.

Step 252: 0.125 second Delay loop. This delay is necessary for glitch caused by turn on of sensor bank 28, 50 or 52 to subside.

Step 254: If laser beam 20 sensed then branch to step 256, else go on to

Step 262: Increment pointer to next sensor bank 28, 50 or 52 that will be activated next.

Step 264: If current sensor bank 28, 50 or 52 activated is the last one in the plurality of sensor banks 28, 50 or 52 then branch to step 268, else go on to Step 266: Turn off present sensor bank 28, 50 or 52 control line 44, 46 or 48 and turn on next one. Branch back to step 252 to check for laser beam 20.
[Conditional branch from step 254]

Step 256: Halt sequential scanning of sensor banks 28, 50 and 52 and compute the elevation of the sensed laser beam 20.

Step 258: Display the information to alpha-numeric display 38 and store the information in ram 56 (FIG. 2). A hard copy of the elevation measurements can then be down loaded later thru the printer port 34. Branch to step 210 for next measurement.
[Conditional branch from step 264]

Step 268: Loop and wait for input from key pad 30 whether to abort or try again. If "try again" then branch to step 250 for another attempt at measurement, else branch to Step 206 to re-display mode request.

DISTANCE MEASUREMENT LOOP—FIG. 7
[Conditional branch from step 274.]

Step 278: Start distance measurement program.

Step 280: Call laser detect sub-routine.
[Return from step 232 in called sub-routine]

Step 282: If detected laser beam flag is set then branch to step 288, else go on to step Step 284: No laser beam 20 was detected. Loop and wait for input from key pad 30 whether to abort or try again. If "try again" then branch to step 280 for another attempt at measurement, else branch to Main program 336 for further instructions from key pad 30 input.
[Conditional branch from step 282]

Step 288: Enable internal period counter (not shown) of microprocessor 54 to timing circuit 60. This counter will be used to compute rotational speed of rotating laser beam 20.

Step 290: Set time-out counter in microprocessor to 150% of published RPM of laser beam 20. This counter is used to ensure correct measurement of exact RPM of laser beam 20.

Step 292: If laser beam 20 is detected then branch to step 300, else go on to

Step 294: If 150% counter not timed out yet then branch to step 292 to continue scanning, else if laser not detected during published 150% time of laser beam 20 RPM then go on to Step 296: No laser beam 20 was detected. Program loops and waits for input from key pad 30 whether to abort or try again. If "try again" then branch to step 280 for another attempt at measurement, else branch to Main program 336 for further instructions from key pad 30 input.
[Conditional branch from step 292]

Step 300: Disable internal period counter (not shown) from timing circuit. Store count in ram 56.

Step 304: Compute exact rotational period of laser beam 20 from stored count.

Step 306: Call laser detect sub-routine.
[Return from step 232 in called sub-routine]

Step 307: If detected laser beam flag is set then branch to step 310, else go on to step Step 308: No laser beam 20 was detected. Loop and wait for input from key pad 30 whether to abort or try again. If "try again" then branch to step 280 for another attempt at measurement, else branch to Main program 336 for further instructions from key pad 30 input.
[Conditional branch from step 307]

Step 310: Enable internal period counter (not shown) of microporcessor 54 to timing circuit 60. This counter will now be used to compute transit time of laser beam 20 between a known distance on stadia enclosure 40, I.E., the distance between sensor #1 176 in sensor bank #1 28 (FIG. 1) and sensor #178 in sensor bank # "N" 52.

Step 312: Turn off sensor bank #1 28 and turn on sensor bank "N" 52.

Step 314: Set time-out counter in microporcessor to 110% of measured RPM laser beam 20. This counter is used to ensure valid measurement of transit time of laser beam 20 within the window of one revolution of laser beam 20.

Step 316: If laser beam 20 is detected within the 110% window then branch to step 324, else go on to Step 318: If 110% window not timed out yet then branch back to step 316 to continue waiting for detection, else if window timed out go on to Step 320: No laser beam 20 was detected. Loop and wait for input from key pad 30 whether to abort or try again. If "try again" then branch to step 306 for another attempt at measurement, else go on to Step 322: Return to main program for further instructions. [Conditional branch from step 316]

Step 324: Disable period counter in microprocessor 54 from timing circuit 60 and store count in memory. Compute the time of transit of the laser beam 20. If time is less then 30% of the measured RPM of laser beam 20 then branch to step 330, else go on to Step 326: Time measured is invalid. Loop and wait for input from key pad 30 whether to abort or try again. If "try again" then branch to step 306 for another attempt at measurement, else go on to Step 328: Return to main program for further instructions.
[Conditional branch from step 324]

Step 330: Compute the distance between laser beam 20 and stadia enclosure 40 using period of rotation of laser beam 20 and timed transit between known distance between sensor #176 in sensor bank #1 178 and sensor #1 178 in sensor bank #"N" 52 (FIG. 1).

Step 332: Display the results to alpha-numeric display 38. Store the information ram 56 (FIG. 2). A hard copy of the distance measurements can then be down loaded later thru the printer port 34.

Step 334: Return to main program for next operation to perform.

LASER DETECT SUB-ROUTINE—FIG. 6

Step 214: laser detect sub-routine beginning.

Step 216: Start the sub-routine.

Step 218: Activate sensor bank #1 28 (FIG. 1) by pulling up control line 44.

Step 220: Set internal counter (not shown) in microprocessor 54 (FIG. 2) for number of attempts desired at detecting laser beam 20.

Step 222: If laser beam 20 is detected then branch to step 224, else go on to

Step 226: .125 second delay window.

Step 228: Decrement number of attempts counter.

Step 230: If attempts counter is not zero (0) then branch to step 222 to continue program, else if attempts counter equals zero (0) then go on to Step 232: Return to caller

[Conditional branch from step 222]

Step 224: Set detected laser beam flag.

Step 232: Return to caller.

SUMMARY RAMIFICATIONS AND SCOPE

The object of the present invention is to provide distance and elevation data for a survey system with a rotary laser beam, which is of economical construction and reasonable resolution. Prior art develops only elevation data.

The problem is solved with the present invention for a survey system with rotary laser beam(s) with an opto-electric stadia which has an array of opto-electric devices, preferably photo voltaic cells, facing one side of stadia, which are connected to evaluation circuit with memory. Evaluation circuit is connected to a display device for instant read-out in field. This data is also stored in memory for further use. All data in memory can be directly printed from evaluation means via an on-board serial port.

Data can be recalled and manipulated via input device. In relation to rotating laser beam, stadia in perpendicular position to beam plane will allow for collecting or elevation data. Stadia in parallel position in beam's plane will allow for accumulation of distance data. In the invention's distance mode the rotational speed and direction of the laser beam is recorded by detection of the laser energy as it impinges the opto-electric elements in the stadia. The recorded time is used to compute the RPM of the laser. This allows invention to be self calibrating and allows lasers of different rotational speeds or direction to be used. The invention next measures the time the laser beam takes to traverse a known distance within the stadia. With these recorded times, the evaluation circuit can readily ascertain distance from rotating laser(s). This makes collection and storage of the three dimensions required for construction and survey work possible. Prior art compiles only elevation data with a rotating laser beam survey system.

An advantage of out invention is collection and storage of distance and elevation data can be done within said stadia. This will produce distance and elevation measurements from rotating laser beam(s) in relation to known points.

Stadia can also be mounted on machine with remote display and input devices to allow operator control and access of data. As GPS (Global Positioning Systems) technology advances, stadia interfaced with GPS will allow for machines to operate machines. The ramifications of this are great. Further ramifications of use can be seen using stadia's on-board serial port to upload new data from peripheral device or to down load collected data to peripheral device for further use.

What is claimed:

1. A method for ascertaining both distance and elevation from known points using electronic survey stadia with a rotating laser or lasers comprising the steps of;

(a) positioning the face of the stadia in a perpendicular vertical position across the plane of rotation of the rotating laser with opto-electronic elements of the stadia arranged in a vertically oriented array so that the light from the laser impinges upon at least one of opto-electronic elements in the stadia to ascertain elevation data;

(b) positioning the face of the stadia in a horizontal position in the plane of the rotating laser with the opto-electronic elements positioned in a horizontally oriented array so that the light from the laser impinges upon a plurality of the horizontally arrayed opto-electric elements in the stadia while the laser rotates; and (c) measuring the time between the laser light impinging upon the opto-electric elements within the stadia and combining that time with the rotational speed and rotational direction of the laser to ascertain distance data.

2. An electronic stadia elongated along an axis for a survey system for use with a laser beam rotating in a horizontal plane to determine both elevation and distance from the rotating laser, the stadia comprising a plurality of opto-electric elements formed in a linear array extending along the elongated axis of the stadia;

a display; and an electronic circuit connected to the opto-electric elements and to the display, the electronic circuit connected so that (i) when the stadia is held in a vertical orientation with the linear array of opto-electric elements oriented vertically, the circuitry will evaluate elevation by determining which one of the opto-electric elements is impinged by the laser beam and display the elevation data on the display, and (ii) when the stadia is held in a horizontal orientation in the plane of the laser beam with the linear array of opto-electric elements oriented horizontally, the circuitry will evaluate distance by measuring the time period elapsing between the when the laser beam impinges upon horizontally separated opto-electric elements in the array, calculate distance from that time measurement, and display the distance data on the display.

* * * * *